UNITED STATES PATENT OFFICE.

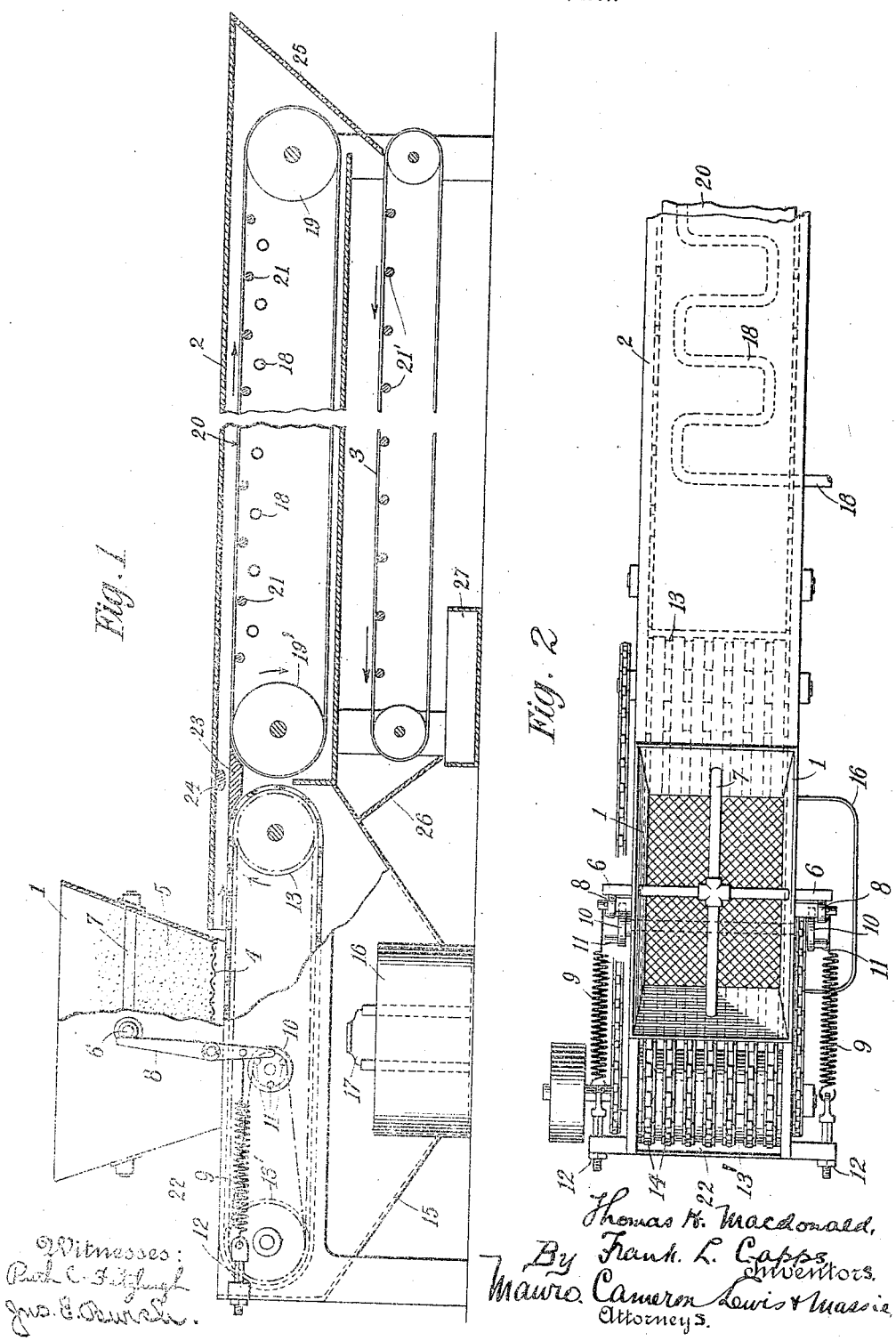

THOMAS H. MACDONALD AND FRANK L. CAPPS, OF BRIDGEPORT, CONNECTICUT, ASSIGNORS TO AMERICAN GRAPHOPHONE COMPANY, OF BRIDGEPORT, CONNECTICUT, A CORPORATION OF WEST VIRGINIA.

APPARATUS FOR COATING DISKS AND SIMILAR ARTICLES.

No. 870,569.  Specification of Letters Patent.  Patented Nov. 12, 1907.

Application filed February 14, 1907. Serial No. 357,397.

*To all whom it may concern:*

Be it known that we, THOMAS H. MACDONALD and FRANK L. CAPPS, both residents of the city of Bridgeport, Connecticut, have invented a new and useful Improvement in Apparatus for Coating Disks and Similar Articles, which improvement is fully set forth in the following specification.

This apparatus is for use in the preparation of disk sound-records, and comprises a hopper or sieve, a compound conveyer, a heating-box, a return conveyer, and suitable actuating mechanism.

The object of the invention is to carry forward the ideas suggested in the Hoyt & Gaven patents of January 2, 1906, (Nos. 808,842, 808,843, and 809,263), and as more particularly set forth in certain other pending applications.

The particular purpose of this apparatus is to place upon suitable disks of paper or the like the proper quantity of "glaze" which is to constitute the surface of the disk sound-records.

The invention will be best understood by reference to the accompanying drawings that represent one embodiment thereof.

In these drawings Figure 1 is a side view partly broken away; and Fig. 2 a plan of a portion of the apparatus.

1 represents the hopper, 2 the heating-box, and 3 the return conveyer. At the bottom of the hopper 1 is a grating 4, having a mesh somewhat larger than is necessary to permit the passage of the powdered material. The latter, indicated at 5, will not flow freely through the grating, because of its tendency to pack.

6 and 7 represent two metal rods or bars mounted in the hopper as indicated, the ends of one of them, as 6, extending on each side beyond the walls of the hopper, so as to be acted upon by the striker 8. There is one of these strikers 8 on each side of the apparatus. It is shown as pivoted to the hopper and connected near one end to a strong spring 9 which tends to hold its other end against the protruding end of the bar 6; while the revolutions of disk 10, carrying one or more (three) pins 11, raise this striker from the bar 6, against the action of its spring 9; and as soon as each pin releases the striker, its spring causes the latter to strike a sharp blow upon the end of the rod 6.

At 12 is shown an adjusting-nut for regulating the tension of the spring 9 so as to regulate the force of the blow.

13—13′ represent drums or the like carrying a plurality of endless chains 14, which latter operate not only as a conveyer, but also as a sieve as will be explained. The drum 13 is driven by power in any suitable manner, which will likewise revolve the disks 10, as by a sprocket-chain or belt.

15 is a pit located beneath the chains 14, so that all of the powdered material 5 that does not fall upon a paper disk, will fall through into this pit 15. By arranging a trough 16 in front of the pit, from which it may be separated by a vertically-sliding door 17, the material that falls through may be scooped up and replaced in the upper hopper 1. A casing incloses conveyer 14 and pit 15, to prevent the escape of material in the form of dust etc.

The heating-box 2 consists of a long tunnel or casing through which extends a number of steam-coils 18. 19—19′ represent drums carrying the endless belt or conveyer 20, drum 19 being driven in any convenient manner, but preferably independent of drum 13. A number of rollers (one of which is shown at 21) may be employed to support the upper surface of the conveyer, or the conveyer may run upon the steam-pipes 18.

The drum 13′ is placed below and in front of the hopper 1, so that an attendant may feed the paper tablets (preferably coated with resin) upon the portion of conveyer 14 which is there exposed by the omission of the casing at 22. The drum 19′ of the conveyer in the heat-box is mounted as close as may be to the drum 13 of the chain-conveyer; and a bridge 23, whose edges are concave to correspond to the two adjacent drums, is mounted between the two and as close to them as convenient. A depending partition 24 may be arranged above bridge 23, leaving between the two only sufficient space for the passage of the successive coated disks.

At the extreme end of the heat-box, and beyond its conveyer, is the reversing-plate 25, diagonal as shown, so as to deliver the heated disks, face downward, to the return-conveyer 3, which needs no further description (except to say that its upper portion may be supported by a number of rollers as 21′). In front of the return conveyer, which is open to the air, and upon which a cooling breeze may be caused to play (or it may be otherwise cooled), may be another diagonal reversing-plate 26, to deposit the successive disks, right side up, into a basket or tray 27. The plate 25 is arranged diagonally as shown merely because the return-conveyer lies underneath the heat-box; if it were desired to have the return-conveyer to extend in the same direction beyond the heat-box, of course there would be no need for arranging this plate 25 diagonally. But if the plate 25 is arranged to reverse the disks, then it is desirable to have the plate 26 diagonal so as to turn the disks right side up, though this latter may be dispensed with.

The operation of our apparatus is as follows: The hopper having been more or less filled with the powdered "glaze", and the proper tension having been imparted to the spring 9 (by the nut 12), the attendant proceeds to place, one after the other, the (resined) disks upon the conveyer 14, at the open space 22 in front of the hopper. As each disk is being carried beneath the sieve 4, the striker 8 is striking smartly upon the framework 6—7, and causes a shower of the powdered material to descend. A sufficient amount is deposited upon the disks in the course of the travel beneath the sieve 4, while the balance of the shower falls into the pit 15 from which it may be used again to replenish the hopper. Meantime, the powdered disks are being carried over the bridge-piece 23 and deposited upon the conveyer in the heat-chamber 2. This chamber should be of considerable length, that the powdered material may be subjected to the heat a sufficient length of time, in order that it may become soft enough to cohere and to adhere to the paper disk. When the disk reaches the end of this chamber, it falls upon the inclined plate 25, and is thereby inverted and delivered face downward upon the cooling conveyer 3; so that, by the time it is delivered into the tray 27, it may be of about normal temperature. If the powder falls too freely, the tension of spring 9 is lessened, so that the blow struck shall not be so heavy, and less powder will fall; and vice versa. The length of the heating-box depends somewhat upon the speed of travel of the conveyers. If they travel very slowly the heat-box may be comparatively short, since the powder will be subjected to the heat during a comparatively long period of time; but if the apparatus be made to run faster, so as to turn out more work in a given time, the heat box should be lengthened accordingly.

The tablets or disks referred to may be of paper or thin cardboard or other suitable material, and they will preferably be coated with resin; and the powdered material referred to may consist wholly or in more or less large proportions of shellac. But the nature of the disks and of the powdered material form no part of the present invention, since our apparatus may be employed for coating any body with any powdered or granular material.

Changes may be made in the construction and arrangement of the parts, and some of the parts of our invention may be used to the exclusion of others, without departing from the spirit of the invention, since we do not limit ourselves to the precise details set forth, having described them with some particularity solely for the sake of clearness.

Having thus described our invention, we claim:

1. The combination of a hopper containing a sieve, a perforated conveyer beneath the same, a striker acting upon said hopper, means for regulating the force of said striker, and means for actuating said conveyer and said striker.

2. The combination with a hopper having a sieve, and a perforated conveyer beneath the same, of a heat-box containing a second conveyer in juxtaposition to the first conveyer.

3. The combination with a hopper having a sieve, and a perforated conveyer beneath the same, of a heat-box containing a second conveyer in juxtaposition to the first conveyer, and a bridge spanning the space between the two conveyers.

4. The combination of a hopper and a conveyer beneath the same, a heat-box having a second conveyer in juxtaposition to the first conveyer, and a cooling conveyer adjacent to said heat-box.

5. The combination of a hopper and a conveyer beneath the same, a heat-box having a second conveyer in juxtaposition to the first conveyer, a cooling conveyer adjacent thereto, and means for inverting articles carried by said heating conveyer to deliver them upside down on the cooling conveyer.

6. The combination with a hopper having one or more transverse bars, a revoluble disk having pins, a lever having adjustable spring control and mounted to be actuated by said pins and to strike upon said bar.

7. A hopper having a sieve, a perforated conveyer beneath the same, common means for imparting a blow to said hopper and for driving said conveyer and means for adjusting the force of the blow.

8. In a disk-coating apparatus, a hopper having a sieve, a plurality of endless chains beneath the same and constituting a perforated conveyer, a casing inclosing said chains and a pit beneath the same, and a trough adjacent to said pit.

In testimony whereof we have signed this specification in the presence of two subscribing witnesses.

THOMAS H. MACDONALD.
FRANK L. CAPPS.

Witnesses:
A. B. KEOUGH.
C. A. GIBNER.